Oct. 2, 1928.
E. H. BRISTOL
1,686,263
MEASURING INSTRUMENT
Filed April 22, 1926
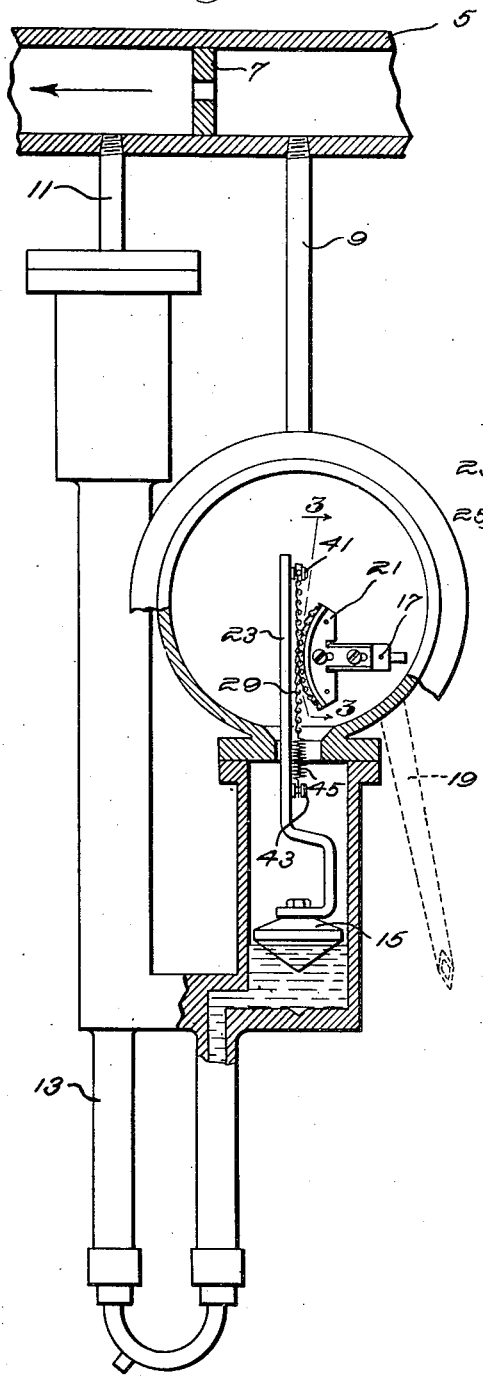
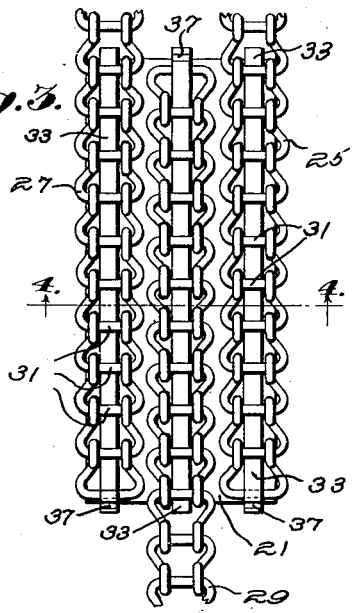
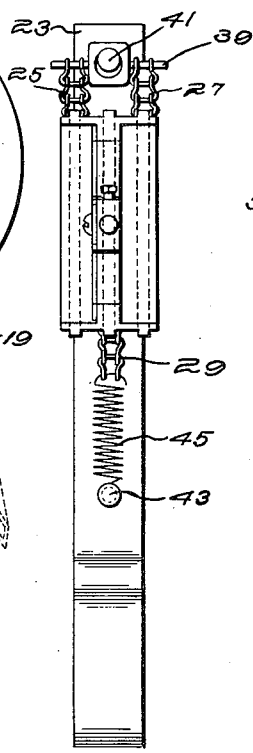
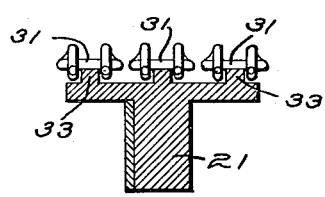
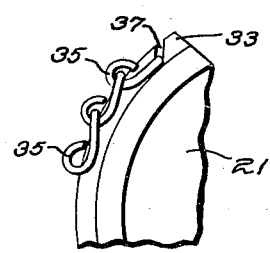
Inventor:
Edgar H. Bristol,
by Emery, Booth, Janney & Varney
Attys.

Patented Oct. 2, 1928.

1,686,263

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

Application filed April 22, 1926. Serial No 103,792.

This invention relates to measuring instruments and the like and the object is to provide, in an instrument having a mechanism movable responsively to the changes of value of some variable which is to be measured, an improved arrangement whereby such movement may be accurately transmitted to some controlled element which it is desired to move in due proportion, which arrangement will have various advantages both from the point of view of the manufacturer and the point of view of the user, as will more fully appear as this description proceeds.

I have herein shown as an example of such an instrument a differential gage of the float type, such as is commonly used for measuring the differential pressure in a fluid developed by means of an orifice meter or the like, and my invention will be readily understood by reference to the following description of said illustrative example taken in connection with the accompanying drawings, wherein:

Fig. 1 is a schematic view, partly in section, of an orifice meter installation comprising a float gage which includes in its construction a specific embodiment of my present invention;

Fig. 2 is an elevation on an enlarged scale of the motion-transmitting couple, as viewed from the right of Fig. 1;

Fig. 3 is a view on a still larger scale on the line 3—3 of Fig. 1;

Fig. 4 is a section on the line 4—4 of Fig. 3; and

Fig. 5 is a fragmentary side elevation of a portion of the driven sector.

Referring to Fig. 1 of the drawings, I have there shown in a schematic manner an orifice meter installation adapted to measure the flow of fluid passing (from right to left in the figure) through the pipe 5 in which is interposed the orifice plate 7. At either side of the orifice plate pipes 9 and 11 lead respectively to the high and low pressure sides of a differential gage 13 which consists essentially of a mercury U tube. Floating on the surface of the mercury in the high pressure chamber is a metal float 15 and the fluctuations of differential pressure raise and lower the float which through suitable connections drives a shaft 17 which in the present instance operates a pen 19, shown in Fig. 1 in dotted lines, cooperating with a recording chart of usual form. The vertical movements of the float 15 are caused to rotate the shaft 17 by means of a suitable wrapping connector cooperating with a sector 21 secured to the shaft and, while not limited thereto, I have herein shown a sector 21 having a face formed as an arc of a circle so that equal increments of the movement of the float may cause equal increments of rotation of the shaft.

I have also herein shown a connection wherein the sector is positively driven in both directions by means of a plurality of wrapping connectors extending in both directions from the ends of the sector respectively. For this purpose I have herein shown a rigid arm 23, preferably of a form to be more fully described hereinafter, extending vertically upward from the float and crossing the face of the sector 21 parallel to a tangent thereto. To rotate the sector 21 clockwise on upward movement of the arm 23 the lower end of the sector 21 may be connected by a pair of chains 25 and 27 to the upper end of the arm 23 and to rotate it counterclockwise on downward movement of the arm the upper end of the sector may be secured by a central chain 29 to a point lower down on the arm 23. These chains comprise relatively narrow cross-bars 31 which are adapted (see Figs. 4 and 5) to extend transversely across and make contact with narrow ridges 33 on the face of the sector 21, said ridges having smooth unbroken faces constituting pitch surfaces for the sector. These cross-bars 31 are suitably linked together pivotally at the sides of the ridges 33 and herein the chain comprises a number of links of round wire of generally U-shaped form, the base of the U comprising the cross-bars 31 and the side arms of the U being terminally looped into eyes 35 embracing the cross-bar 31 of an adjacent link. The side arms and the eyes 35 formed therein are disposed, as shown in Fig. 4, at the sides of the raised ribs 33 on the sector 21 and are supported thereby above the bottoms of the intervening grooves. The type of chain herein illustrated is sometimes known as a ladder chain.

Such a chain as has been described is readily made by known methods from suitable material and need not be so small to adapt it to the application shown as to make its manufacture difficult. As contrasted with the usual arrangements of chains and chain drums in the mechanical arts, wherein the drum is in some manner grooved or recessed to fit the chain, the chain herein cooperates with the perfectly smooth unbroken working face of the sector, herein represented by the face of a rib 33, which is readily and accurately formed. There is no necessity that any part of the chain be housed accurately in any recess provided therefor. The crossbars 31 of the chain are of small dimension and lie closely against the pitch surface of the ribs 33. Ample flexibility is provided by the linking of the chain which, however, is provided for without affecting the driving contact of the chain and the sector.

Referring particularly to Fig. 5 of the drawings, the chains may conveniently be fastened to the sector by providing in the ends of ribs 33 oblique notches 37, each of which is adapted to receive a cross-bar 31 at one end of a length of chain. The lateral chains 25 and 27 may have their terminal eyes 35 at their opposite ends threaded over the arms of an equalizer bar 39 centrally pivoted on a stud 41 at the upper end of arm 23. The end of the central chain 29 may be secured to the stud 43 on the face of arm 23 by means of a helical spring 45 hooking through the terminal eyes 35 on the same. The spring 45 takes up all looseness of the connection. By referring, however, to Fig. 3, it will be noted that the portions of the chains which lead from the face of the sector lie in a straight line so that there is no tendency for the spring to move the segment since it draws in a straight line against the stud 41.

Referring particularly to Fig. 1, the bar 23 to which the chains are attached is preferably connected to the float 15 at a point in the vertical axis of the latter and the upper portion thereof to which the chains are attached is shown as offset to the left in the figure while the lower portion is offset to the right, this lower portion herein being shorter but offset for a greater distance. This arrangement is preferably adopted to balance the bar 23 so that there will be no tendency for it to tip sidewise. If the bar, or the bar and the float, were suspended from its or their center of gravity, the line connecting the center of gravity with the point of suspension, in other words, the axis of suspension, would lie in the plane of the connecting chains 25, 27 and 29. The float and bar are therefore balanced under gravity to rest in the exact vertical position shown in Fig. 1 and to move accurately in a vertical line.

I have described in detail the particular form of my invention shown by way of example in the accompanying drawings. Obviously the construction might be widely varied mechanically and in the application of the principles involved without departing from the scope of the invention. The detailed character of the description is therefore not to be taken as in any way definitive of the scope of the invention.

What I claim as new and desire to secure by Letters Patent I shall express in the following claims.

1. In an instrument wherein a member is moved responsively to the fluctuations of a variable means for transmitting said movement proportionately to a driven device comprising an oscillating sector and a cooperating reciprocating element, said sector having a relatively narrow continuous working face and a wrapping connector between the parts comprising a series of narrow cross-bars overlying said face and means flexibly interlinking said cross-bars disposed laterally of said face.

2. In an instrument wherein a member is moved responsively to the fluctuations of a variable means for transmitting said movement proportionately to a driven device comprising an oscillating sector and a cooperating reciprocating element, said sector having a relatively narrow continuous working face and a wrapping connector between the parts comprising a wire chain having generally U-shaped links, the cross-bars of the U's overlying and extending laterally beyond said face and the side arms lying laterally of the same and being terminally looped about the cross-bar of an adjacent link.

3. In an instrument wherein a member is moved responsively to the fluctuations of a variable means for transmitting said movement proportionately to a driven device comprising an oscillating sector and a cooperating reciprocating element, a pair of wrapping connectors secured adjacent one side of the sector, an equalizer bar pivoted to said element, said connectors secured to the sides of said bar, and a third wrapping connector between the two and including a tension spring, said connector secured adjacent the opposite side of the sector extending in the opposite direction and secured to said element.

4. In an instrument wherein a member is moved responsively to the fluctuations of a variable means for transmitting said movement proportionately to a driven device comprising an oscillating sector and a cooperating reciprocating element, a pair of wrapping connectors secured adjacent one side of the sector, an equalizer bar pivoted to said element, said connectors secured to the sides of said bar, and a third wrapping connector between the two and including a tension spring, said connector secured adjacent the opposite side of the sector extending in the opposite direction and secured to said element, said connectors comprising wire chains having generally U-shaped links with arms terminally looped about the cross-bars of adjacent links and said sector having ridges received between the looped portions and making contact with the cross-bars.

5. In an instrument wherein a member is moved responsively to the fluctuations of a variable means for transmitting said movement proportionately to a driven device comprising an oscillating sector and having a narrow edge portion provided adjacent one end with an oblique notch, a cooperating reciprocating element and a wrapping connecting chain between said sector and element comprising a series of cross-bars longer than the width of said portion and pivotally connected adjacent their ends, a terminal cross-bar being seated in said notch and other cross-bars overlying said edge.

6. In an instrument wherein a member is moved responsively to the fluctuations of a variable means for transmitting said movement proportionately to a driven device comprising an oscillating sector and having a narrow edge portion provided adjacent one end with an oblique notch, a cooperating reciprocating element and a wrapping connecting chain between said sector and element comprising a series of U-shaped wire links, the arms of the U's being looped about the bases of the U of an adjacent link, the base of a terminal link being seated in said notch and the bases of adjacent links overlying said edge with the arms disposed laterally thereof.

7. In an instrument of the class described a driven shaft, a sector thereon, a weight, an arm carried thereby, a wrapping connector between the sector and a point on a side of the arm, the arm and weight being shaped to provide an axis of suspension tangent to the sector and passing through the point of attachment of said connector to said arm.

8. In an instrument of the class described a driven shaft, a sector thereon, a weight, an arm carried thereby, wrapping connectors extending in opposite directions from said sector and secured to said arm, the arm and weight being shaped to provide an axis of suspension passing through the points of attachment of said connectors to said arm.

9. In an instrument of the class described a driven shaft, a sector thereon, an arm having a part extending across the face of the sector, wrapping connectors extending in opposite directions from said sector and secured to said part of the arm, said arm also having an offset portion providing an axis of suspension therefor passing through the points of attachment of said connectors to the arm, and a weight centrally attached to said arm at a point lying in said axis.

In testimony whereof, I have signed my name to this specification.

EDGAR H. BRISTOL.